US010012992B2

(12) United States Patent
Shydo, Jr.

(10) Patent No.: US 10,012,992 B2
(45) Date of Patent: Jul. 3, 2018

(54) INTEGRATED OBSTACLE DETECTION AND PAYLOAD CENTERING SENSOR SYSTEM

(71) Applicant: Amazon Technologies, Inc., Seattle, WA (US)

(72) Inventor: Robert Michael Shydo, Jr., Pelham, NH (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 15/265,925

(22) Filed: Sep. 15, 2016

(65) Prior Publication Data

US 2018/0074504 A1    Mar. 15, 2018

(51) Int. Cl.
*G05D 1/02* (2006.01)
*G05B 19/4061* (2006.01)
*B25J 9/16* (2006.01)

(52) U.S. Cl.
CPC .......... *G05D 1/0214* (2013.01); *B25J 9/1697* (2013.01); *G05B 19/4061* (2013.01); *G05D 1/0246* (2013.01); *G05B 2219/39046* (2013.01); *G05D 2201/0216* (2013.01); *Y10S 901/01* (2013.01)

(58) Field of Classification Search
USPC ........................................................ 700/216
See application file for complete search history.

(56) References Cited

U.S. PATENT DOCUMENTS

| | | |
|---|---|---|
| 2006/0210382 A1 | 9/2006 | Mountz et al. |
| 2007/0288123 A1 | 12/2007 | D'Andrea et al. |
| 2008/0001372 A1* | 1/2008 | Hoffman ............... G06Q 10/087 280/35 |
| 2008/0167933 A1* | 7/2008 | Hoffman ............... G06Q 10/087 705/28 |
| 2011/0060449 A1* | 3/2011 | Wurman ............ G05B 19/4189 700/218 |

(Continued)

FOREIGN PATENT DOCUMENTS

WO    2015188193 A1    12/2015

OTHER PUBLICATIONS

Written Opinion dated (PCT/US2017/051623).
International Search Report dated Dec. 18, 2017 (PCT/US2017/051623).

*Primary Examiner* — Kyle O Logan
(74) *Attorney, Agent, or Firm* — Thomas Horstemeyer, LLP

(57) ABSTRACT

Disclosed are various embodiments for an integrated obstacle detection and payload centering sensor system. A robotic drive unit (RDU) captures, with a downward facing camera mounted to itself, an image of fiducial located on the ground. The RDU then positions itself over the fiducial and subsequently rotates. As it rotates, the RDU captures a point cloud of the surround vicinity a forward-facing three-dimensional camera mounted to itself. The RDU then identifies in the point cloud at least two legs of a storage unit positioned over the robotic drive unit. Subsequently, the RDU determines a location for each of the at least two legs relative to the fiducial and triangulates a center of the storage unit based at least in part on the location of each of the at least two legs. The RDU then centers itself underneath the storage unit.

20 Claims, 10 Drawing Sheets

(56) References Cited

U.S. PATENT DOCUMENTS

| | | | |
|---|---|---|---|
| 2011/0153063 A1* | 6/2011 | Wurman | B65F 3/00 |
| | | | 700/218 |
| 2015/0032252 A1* | 1/2015 | Galluzzo | B25J 5/007 |
| | | | 700/218 |
| 2015/0073589 A1* | 3/2015 | Khodl | B25J 5/007 |
| | | | 700/218 |
| 2016/0026186 A1 | 1/2016 | Kazama et al. | |
| 2016/0259339 A1 | 9/2016 | High et al. | |

* cited by examiner

INTEGRATED OBSTACLE DETECTION AND PAYLOAD CENTERING SENSOR SYSTEM

BACKGROUND

Autonomous robots are often used to perform tasks within a warehouse or similar environment. Such tasks can include moving items, shelves, boxes, or other storage containers; recharging batters (e.g., of other autonomous robots); and other tasks. The use of autonomous robots has a number of advantages. For instance, items in the warehouse can be stacked closer together because the robots can be engineered to require less space than a human would require to perform a similar task. Larger and heavier items can be stored in the warehouse as a robot can transport a heavier item than a human can. Likewise, the labor costs associated with operating a warehouse are decreased due to the use of autonomous robots.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Autonomous robots are often used to perform tasks within a warehouse or similar environment. These autonomous robots often have a number of sensors to allow them to perform their functions. For instance, the autonomous robots may have a camera that is used to collect data to determine the position of the autonomous robot. The autonomous robots may also use a second camera to detect objects that are currently in the path of the autonomous robot in order to avoid a collision. The autonomous robots may also use a separate camera to identify items to be transported or storage units in which the items are located.

Disclosed are various embodiments of a robotic drive unit for use in transporting items a warehouse or similar environment. The robotic drive units are configured to use an integrated sensor system for obstacle detection and avoidance and payload centering. In other versions of robotic drive units, these functions may be performed using separate sensor systems. For example, obstacle detection may be performed using one camera while payload centering may rely on a separate camera. However, improvements in image processing techniques and improvements in camera technology make it feasible to use the same camera for multiple functions. The use of fewer cameras in the construction of a robotic drive unit decreases the cost. However, different techniques are required to perform both obstacle avoidance and payload centering functions with the same camera.

Figure 1:
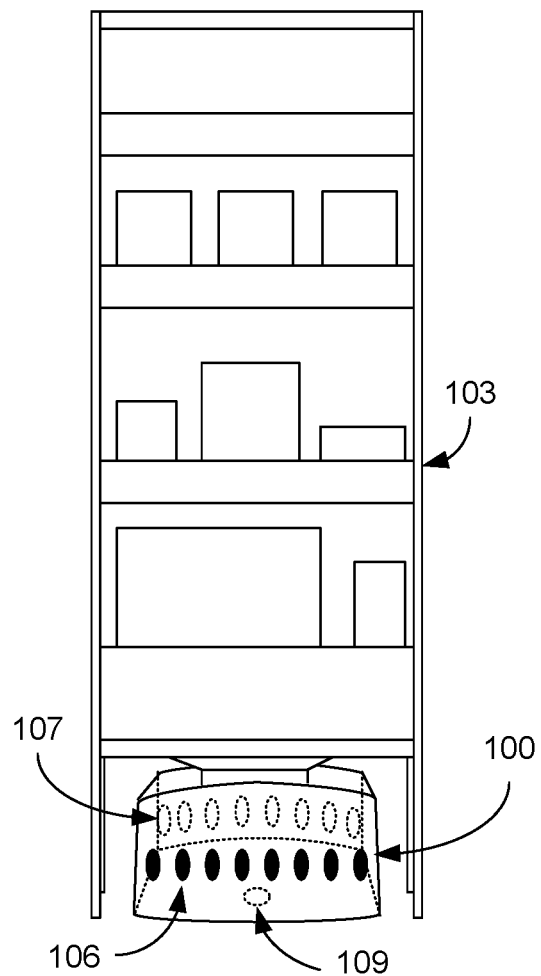
FIG. 1 is a drawing of an example implementation of various embodiments of the present disclosure.

Beginning with FIG. 1, an example of a robotic drive unit ("RDU") 100 is depicted. The RDU 100 can position itself underneath a storage unit 103. The storage unit 103 can include various storage shelves, racks, pallets, bins, containers or similar storage devices which may be used in a warehouse environment to store multiple items. After positioning itself under the storage unit 103, the RDU 100 can lift the storage unit 103 off of the ground, allowing the RDU to move the storage unit 103 to a new location.

The RDU 100 can also include various image capture devices, such as cameras, three-dimensional cameras, point-cloud scanners, or similar devices. For example, the RDU 100 can include one or more forward-facing image capture devices 106. The forward-facing image capture device 106 may typically be mounted on the front of the RDU 100. However, the forward-facing image capture device 106 can be mounted on the top, side, or other surface of the RDU 100 and positioned to face forward. In some embodiments, however, second rear-facing image capture device 107 can be mounted on the RDU 100. In these embodiments, the rear-facing image capture device 107 may typically be mounted on the rear of the RDU 100. However, the rear-facing image capture device 107 can also be mounted on the top, side, or other surface of the RDU 100 and positioned to face towards the rear of the RDU 100. The RDU 100 can also include one or more downward-facing image capture devices 109. The downward-facing image capture device 109 may be positioned on the undercarriage or bottom of the RDU 100. However, in other embodiments, the downward-facing image capture device 109 can be located elsewhere on the RDU 100 and positioned to face down.

The RDU 100 can also include additional circuitry, such as a processor, a memory, and a network interface. These components enable the RDU 100 to operate in an autonomous manner. For example, the memory can both data and machine-readable instructions that are executable by the processor to cause the RDU 100 to perform a particular task. The memory of the RDU 100 is defined herein as including both volatile and nonvolatile memory and data storage components. Volatile components are those that do not retain data values upon loss of power. Nonvolatile components are those that retain data upon a loss of power. Thus, the memory of the RDU 100 can include various types of random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device. Also, the processor may represent multiple processors or multiple processor cores and the memory may represent multiple memories that operate in parallel processing circuits, respectively. The processor may be of electrical or of some other available construction. The network interface can correspond to any optical or electrical device that allows the RDU 100 to maintain data communication with another device, such as a remote computing device (e.g., a server). For example, the network interface could correspond to an Institute of Electrical and Electronics Engineers ("IEEE") 802.11 (i.e. "WI-FI") interface, a microwave networking interface, a short range wireless interface (e.g., BLUETOOTH), or other network interface.

Figure 2:
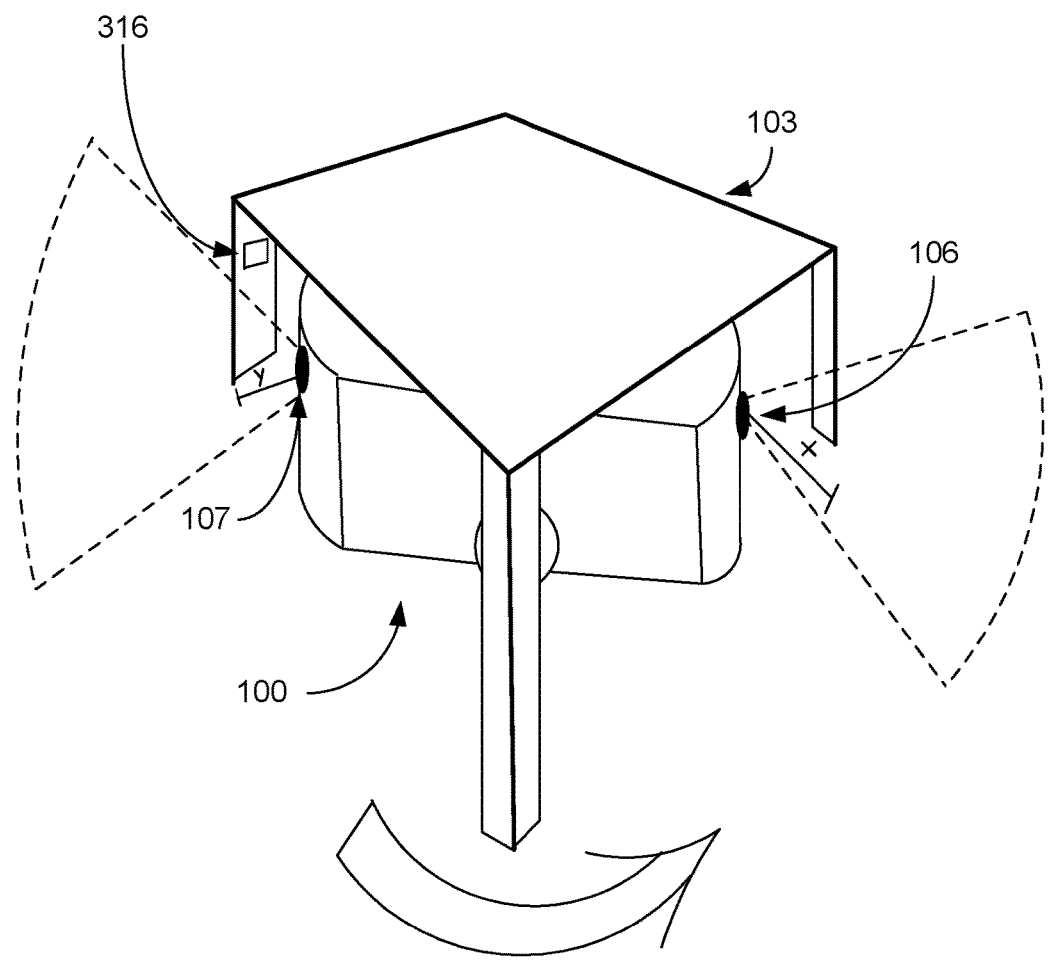
FIG. 2 is a drawing of an example implementation of various embodiments of the present disclosure.

Moving on to FIG. 2, an example illustration of the operation of the RDU 100 is provided. Here, the RDU 100 positions itself beneath a storage unit 103. The RDU 100 then rotates underneath the storage unit 103 to generate a panoramic image in the vicinity of the storage unit 103. In embodiments where the RDU 100 only has either a forward-facing image capture device 106 or a rear-facing image capture device 107, the RDU 100 may rotate 360 degrees. The panoramic image can include a single image, a series of image that overlap and can be stitched together to form a single image, a series of images capture adjacent portions of the viewable vicinity of the RDU 100, a video, or other representation. In embodiments where the RDU 100 has both a forward-facing image capture device 106 and a rear-facing image capture device 107, the RDU 100 may rotate less (e.g., 180 degrees). After generating the panoramic image, the RDU 100 can then identify at least two legs of the storage unit 103 and determine its position relative to the center of the storage unit 103 based on the identified two legs. If the RDU 100 determines that it is off-center, the RDU 100 can center itself under the storage unit 103 prior to attempting to lift and move the storage unit 103.

In some instances, the RDU 100 may also identify a storage unit fiducial 316 within the panoramic image in order to determine the identity of the storage unit 103 or the contents of the storage unit 103. The storage unit fiducial 316 may be located on a leg of the storage unit 103. However, the storage unit fiducial 316 could be placed in other visible locations or multiple storage unit fiducials 316 could be affixed to the storage unit 103.

Figure 3:
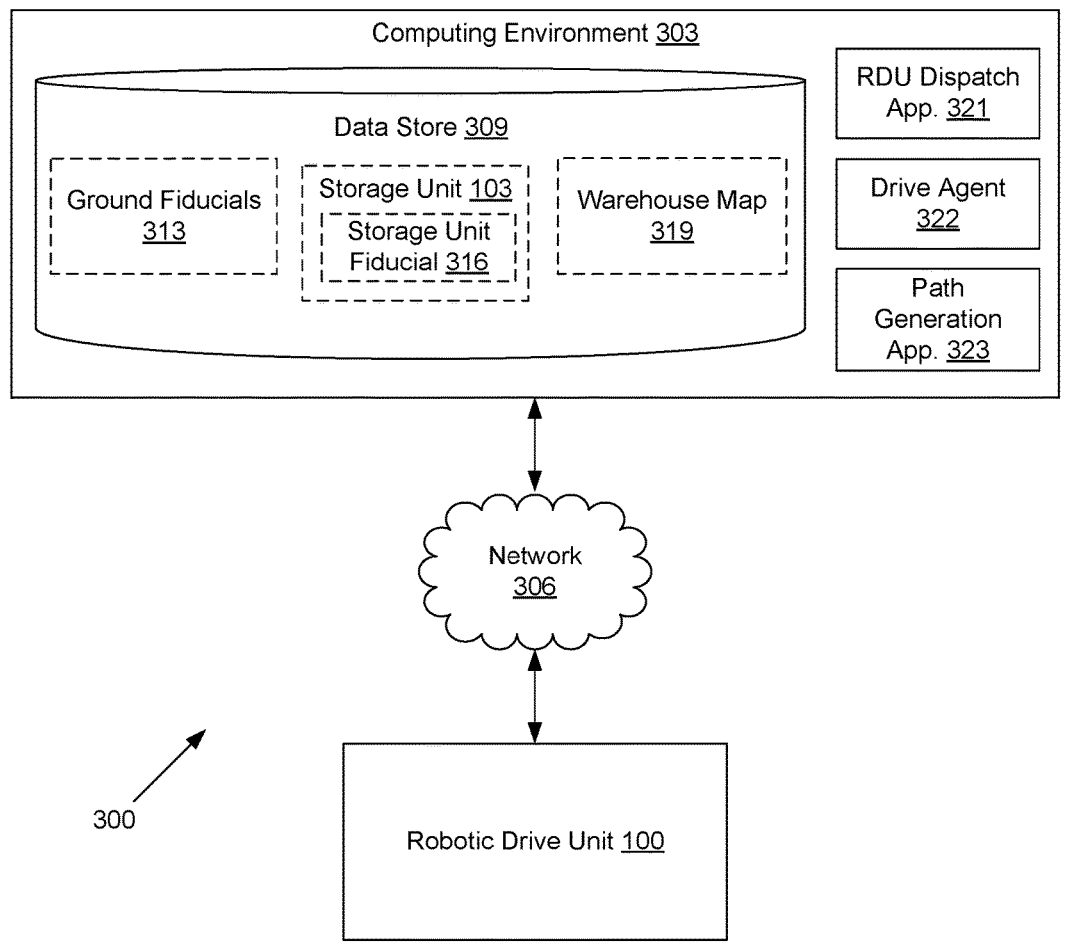
FIG. 3 is a drawing of a networked environment according to various embodiments of the present disclosure.

With reference to FIG. 3, shown is a networked environment 300 according to various embodiments. The networked environment 300 includes a computing environment 303 and a robotic drive unit 100, which are in data communication with each other via a network 306. The network 306 can include the Internet, intranets, extranets, wide area networks (WANs), local area networks (LANs), or any combination of two or more such networks. For example, such networks may include wired networks (e.g., cable networks, Ethernet networks, fiber optic networks, telephone networks, digital subscriber line networks, or other wired network technologies) or wireless networks (e.g., satellite networks, IEEE 802.11 "WI-FI" networks, mesh networks, cellular networks, or other wireless network technologies).

The computing environment 303 may include a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together form a hosted computing resource, a grid computing resource or any other distributed computing arrangement. In some cases, the computing environment 303 may correspond to an elastic computing resource where the allotted capacity of processing, network, storage, or other computing-related resources may vary over time.

Also, various data is stored in a data store 309 that is accessible to the computing environment 303. The data store 309 may be representative of a plurality of data stores 309 as can be appreciated, such as relational databases, key-value stores, hierarchical databases, object-oriented databases, comma or tab separated text files, configuration files, and potentially other data stores. The data stored in the data store 309, for example, is associated with the operation of the various applications or functional entities described below. The data stored in the data store 309 includes, for example, ground fiducials 313, storage units 103 and storage unit fiducials 316, a warehouse map 319, and potentially other data.

A ground fiducial 313 corresponds to a marker located on the ground that has an identifier encoded on it. Each ground fiducial 313 corresponds to a unique location on the warehouse map 319, allowing an RDU 100 to determine its position based on one or more nearby ground fiducials 313. A ground fiducial 313 could include bar code or other easily imaged optical, machine-readable, representation of data. The bar code could include, for example, a linear bar code or a two-dimensional bar code. Examples of two-dimensional bar codes include matrix style bar codes, such as a quick response ("QR') code of SPARQCode, circular style bar codes (e.g., "ShotCode"), or other schemes for optically encoding data in a two-dimensional shape.

Information about each storage unit 103 may also be stored in the data store 309. This information can include the contents of the storage unit 103, the location of the storage unit 103, and potentially other data. A storage unit fiducial 316 can also be associated with each storage unit 103. A storage unit fiducial 316 corresponds to a marker located on a storage unit 103 that has an identifier encoded on it. Each storage unit fiducial 316 can serve to uniquely identify a storage unit 103 to which the storage unit fiducial 316 is attached. For example, an RDU 100 could identify a storage unit 103 and the contents of the storage unit 103 by scanning the storage unit fiducial 316 to obtain the identifier of the storage unit 103 and querying the data store 309.

A warehouse map 319 stores a spatial representation of a warehouse or similar structure. For example, the warehouse map 319 can include data about the locations of structures in a corresponding warehouse, particular areas or zones within a warehouse (e.g., locations where storage units 103 should be stored), locations of individual items or entities (e.g., current locations of individual storage units 103 or RDUs 100), and potentially other data. This data may be stored in a number of formats, such as a Cartesian coordinate system, a polar coordinate system, or other appropriate two- or three-dimensional coordinate system.

Various applications or other functionality may be executed in the computing environment 303 according to various embodiments. The components executed on the computing environment 303 can include an RDU dispatch application 321, a drive agent 322, a path generation application 323, and other applications, services, processes, systems, engines, or functionality not discussed in detail herein.

The RDU dispatch application 321 serves to organize the operation of one or more RDUs 100. The RDU dispatch application 321, for example, may instruct an RDU 100 to move a particular storage unit 103 to a new location, verify that an RDU 100 has retrieved the correct storage unit 103 based at least in part upon a message received from the RDU 100 containing an identifier of the storage unit 103, and potentially other functions.

The drive agent 322 can be executed to operate as a controller for the RDU 100 in some embodiments. The drive agent 322 can receive or query data from the RDU 100, such as sensor readings or data. The drive agent 322 can then determine an appropriate action to be performed by the RDU 100 and send one or more instructions to the RDU 100 that cause the RDU 100 to perform the action. In some instances, a separate instance of the drive agent 322 can be executed for controlling each RDU 100. In other instances, a single drive agent 322 can be executed to control or otherwise manage the actions of multiple RDUs 100.

The path generation application 323 is executed to identify and provide a path between two points to an RDU 100 based at least in part on information provided by the RDU 100. The path generation application 323 may use various approaches for determining a path between two points on the warehouse map 319 for an RDU 100. Such approaches can include grid-based approaches that rely on the placement of ground fiducials 313 within a warehouse, such as the any-angle path planning method, the A* graph traversal method, or similar approaches. The path generation application 323 can also consider the presence of known obstacles when generating a path. These obstacles could be permanent (e.g., walls, pillars, drainage troughs, or other building features) or temporary (e.g., items that have fallen on the floor, disabled RDUs 100, or other obstacles).

Next, a general description of the operation of the various components of the networked environment 300 is provided. To begin, an RDU 100 approaches a storage unit 103 and moves underneath the storage unit 103. The RDU 100 then captures an image of a ground fiducial 313 using the downward-facing image capture device 109 and centers itself on the ground fiducial 313. Subsequently, the RDU 100 rotates in place around the ground fiducial 313 to capture a panoramic image with the forward-facing image capture device 106. After capturing the panoramic image, the RDU 100 identifies a plurality of legs of the storage unit 103 in the panoramic image and measures a distance from each of the plurality of legs of the storage unit 103 to the ground fiducial 313. The RDU 100 can then calculate a location of the center of the storage unit 103 relative to the ground fiducial 313 and determine whether it is located off-center relative to the storage unit 103. If the RDU 100 is off-center relative to the storage unit 103, the RDU 100 can then adjust its position so that the RDU 100 is located underneath the center of the storage unit 103. After centering itself under the storage unit 103, the RDU 100 then lifts the storage unit 103.

In some instances, the RDU 100 can also identify a storage unit fiducial 316 in the panoramic image. If the RDU 100 does so, it may extract the identifier of the storage unit 103 from the image of the storage unit fiducial 316 and send a request over the network 306 containing the identifier of the storage unit 103 to the RDU dispatch application 321. The RDU 100 may perform this step in order to verify that it is interacting with the correct storage unit 103. The RDU dispatch application 321 can then provide a response via the network 306 to indicate to the RDU 100 whether or not the RDU 100 is underneath or interacting with the correct storage unit 103.

The RDU 100 can then begin to move the storage unit 103 to a new location after lifting the storage unit 103. Prior to moving the storage unit 103, the RDU 100 may first capture an image using the front-facing image capture device 106. The RDU 100 may then periodically capture additional images using the front-facing image capture device 106 while the RDU 100 is in motion with the storage unit 103. While moving, the RDU 100 may compare the most recently capture image with one or more previously captured images in order to ensure that the storage unit 103 is moved safely. For example, the RDU 100 could measure a change in position of one or more legs of the storage unit 103 appearing in the images to determine whether the storage unit has changed position or orientation on top of the RDU 100. Likewise, the RDU 100 could determine that where one or more legs of the storage unit 103 appeared in a previous image but none of the legs appear in a current image, then the storage unit 103 had fallen off of the RDU 100. In this situation, the RDU 100 might send an alert to the RDU dispatch app 321 to indicate that the storage unit 103 had fallen. As another example, the RDU 100 could measure an amount of vertical displacement of individual legs of the storage unit 103 between images. Based on these measurements, the RDU 100 could determine whether the storage unit 103 is swaying during transport and whether or not the storage unit 103 is in danger of tilting and falling off. The RDU 100 could adjust its speed or request a new path from the path generation application 323 in order to prevent a swaying storage unit 103 from falling off.

While the RDU 100 is in motion, the RDU 100 could also analyze the images captured with the forward-facing image capture device 106 to detect and identify potential obstacles in the path being followed by the RDU 100. Obstacles could include other RDUs 100, people, storage units 103, or any other unexpected object in the path of the RDU 100. In response to identifying an obstacle, the RDU 100 could send a request over the network 306 to the path generation application 323 for a new path. The RDU 100 could then follow a new path provided by the path generation application 323 that guides the RDU 100 to its final destination.

However, in one or more alternative embodiments, one or more of these functions could alternatively be implemented by the drive agent 322. For example, the drive agent 322 could instruct an RDU 100 to approach a storage unit 103 and move underneath the storage unit 103. After the RDU 100 has indicated that is has moved underneath the storage unit 103, the drive agent 322 could instruct the RDU 100 to capture an image of a ground fiducial 313 using the downward-facing image capture device 109. The drive agent 322 could then instruct the RDU 100 to center itself on the ground fiducial 313. The RDU 100 could then report to the drive agent 322 after it has centered itself and request additional instructions. The drive agent 322 could then instruct the RDU 100 to rotate in place around the ground fiducial 313 to capture a panoramic image with the forward-facing image capture device 106. The RDU 100 could then provide the captured image to the drive agent 322. The drive agent 322 could then process the image to identify a plurality of legs of the storage unit 103 in the panoramic image and measure a distance from each of the plurality of legs of the storage unit 103 to the ground fiducial 313. In some instances, however, the drive agent 322 could request that an image processing application perform these calculations. The drive agent 322 could then then calculate a location of the center of the storage unit 103 relative to the ground fiducial 313 and determine whether the RDU 100 is located off-center relative to the storage unit 103. If the RDU 100 is off-center relative to the storage unit 103, the drive agent 322 could then instruct the RDU 100 to adjust its position so that the RDU 100 is located underneath the center of the storage unit 103. After the RDU 100 centers itself under the storage unit 103, the drive agent 322 could then instruct the RDU 100 to lift the storage unit 103.

In some instances, the drive agent 322 can also identify a storage unit fiducial 316 in the panoramic image. If the drive agent 322 does so, it may extract the identifier of the storage unit 103 from the image of the storage unit fiducial 316 and send a request containing the identifier of the storage unit 103 to the RDU dispatch application 321. The drive agent 322 may perform this step in order to verify that the RDU 100 is interacting with the correct storage unit 103. The RDU dispatch application 321 can then provide a response to indicate to the drive agent 322 whether or not the RDU 100 is underneath or interacting with the correct storage unit 103.

The drive agent 322 can then instruct the RDU 100 to begin to move the storage unit 103 to a new location after lifting the storage unit 103. Prior to moving the storage unit 103, the drive agent 322 may first instruct the RDU 100 to capture an image using the front-facing image capture device 106. The drive agent 322 could further instruct the RDU 100 to periodically capture additional images using the front-facing image capture device 106 while the RDU 100 is in motion with the storage unit 103. The RDU 100 could then provide one or more of these images to the drive agent 322 while the RDU 100 is in motion. The drive agent 322 could then compare the most recently capture image with one or more previously captured images in order to ensure that the storage unit 103 is moved safely. For example, drive agent 322 could measure a change in position of one or more legs of the storage unit 103 appearing in the images to determine whether the storage unit has changed position or orientation on top of the RDU 100. Likewise, the drive agent 322 could determine that where one or more legs of the storage unit 103 appeared in a previous image but none of the legs appear in a current image, then the storage unit 103 had fallen off of the RDU 100. In this situation, the drive agent 322 might send an alert to the RDU dispatch app 321 to indicate that the storage unit 103 had fallen and send an instruction to the RDU 100 to stop. As another example, the drive agent 322 could measure an amount of vertical displacement of individual legs of the storage unit 103 between images. Based on these measurements, the drive agent 322 could determine whether the storage unit 103 is swaying during transport and whether or not the storage unit 103 is in danger of tilting and falling off. The drive agent 322 could then instruct the RDU 100 to adjust its speed. Alternatively, the drive agent 333 could request a new path from the path generation application 323 in order to prevent a swaying storage unit 103 from falling off.

While the RDU 100 is in motion, the drive agent 322 could also analyze the images captured with the forward-facing image capture device 106 to detect and identify potential obstacles in the path being followed by the RDU 100. Obstacles could include other RDUs 100, people, storage units 103, or any other unexpected object in the path of the RDU 100. In response to identifying an obstacle, the drive agent 322 could send a request to the path generation application 323 for a new path. The drive agent 322 could then instruct the RDU 100 to follow a new path provided by the path generation application 323 for the RDU 100 to reach its final destination.

Figure 4A:
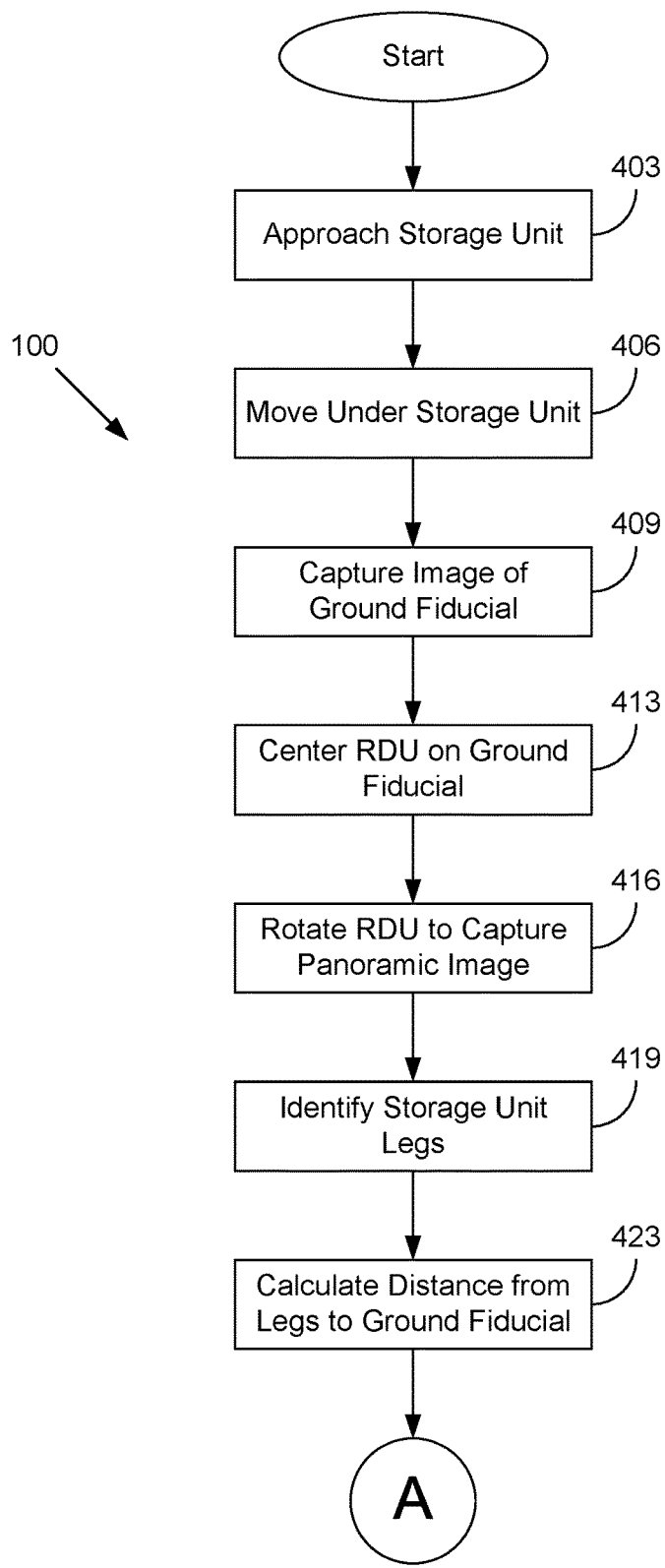
FIGS. 4A-4C depict a flowchart illustrating one example of functionality implemented as portions of the robotic drive unit in the networked environment of FIG. 3 according to various embodiments of the present disclosure.
Figure 4B:
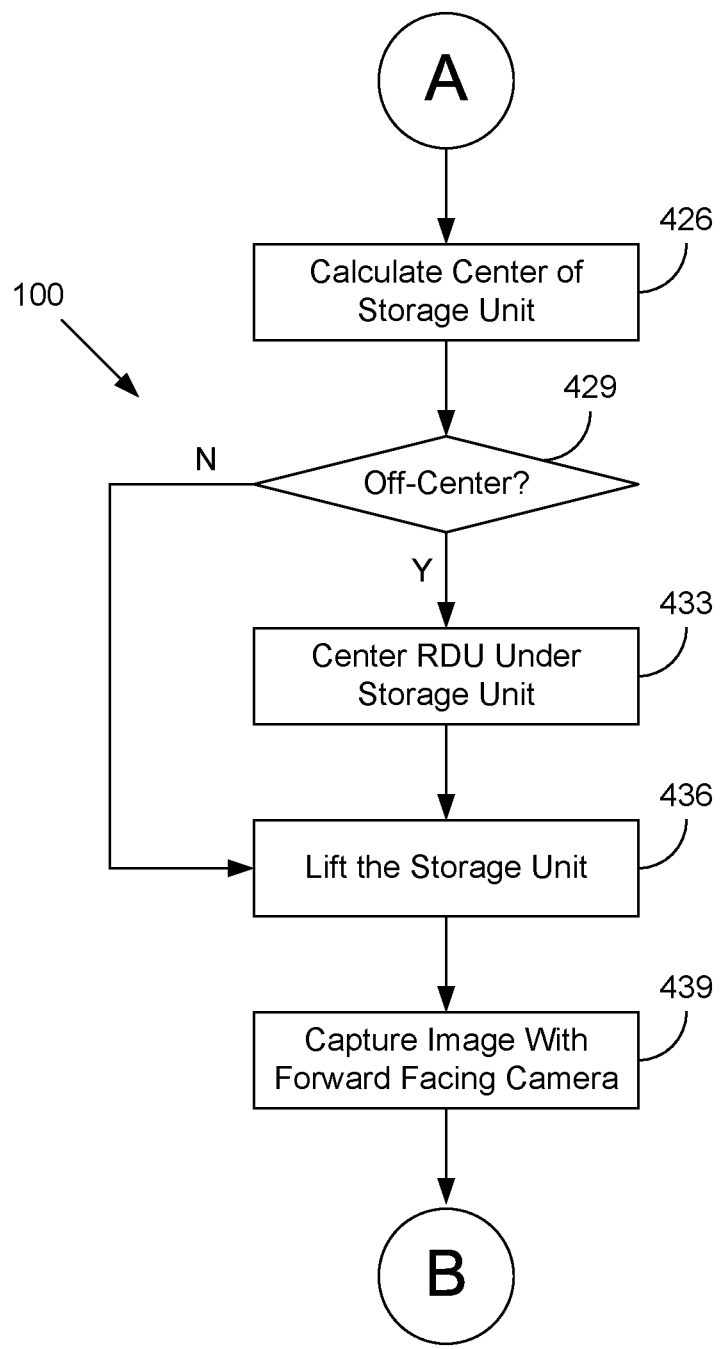
Figure 4C:
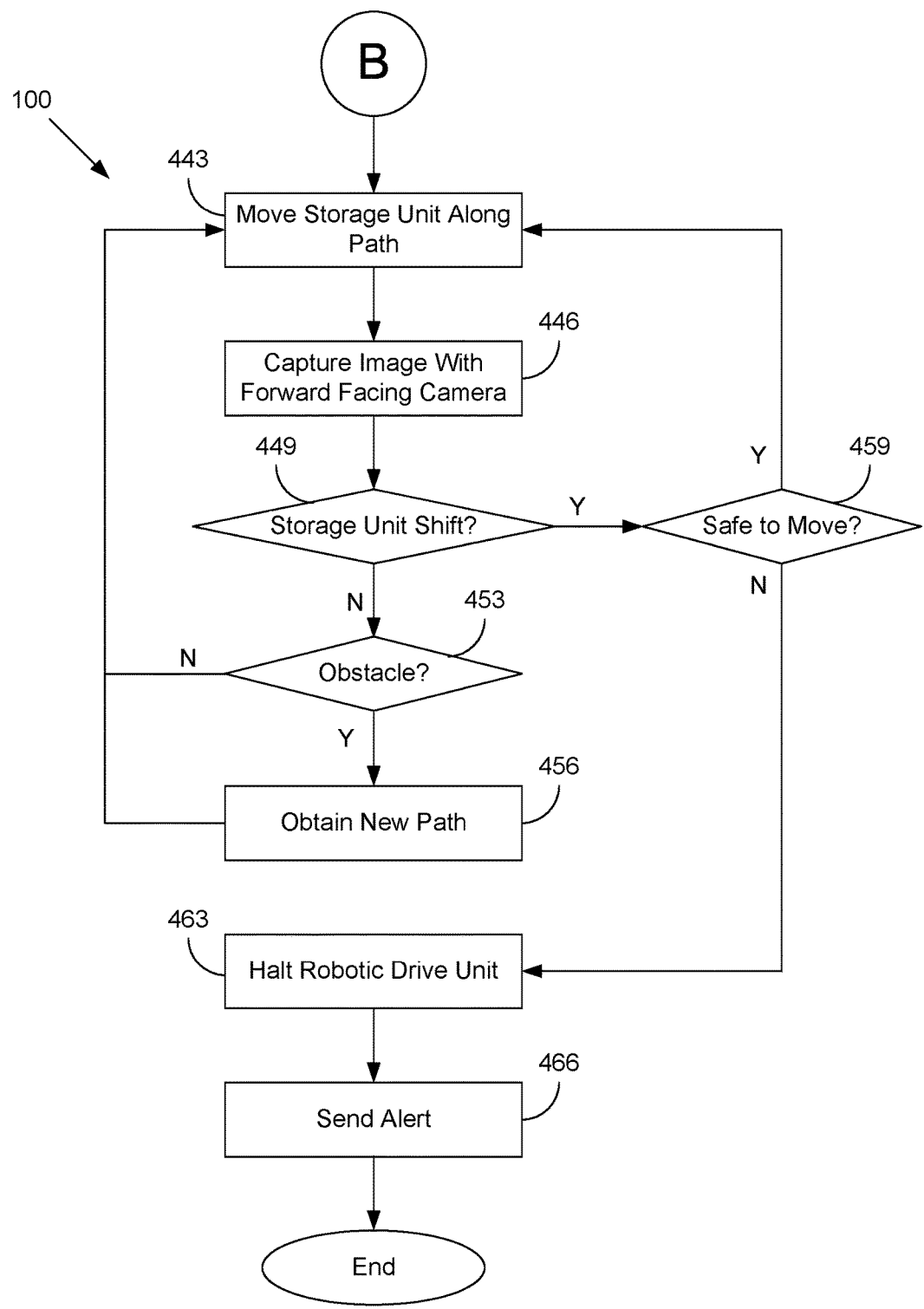

Referring next to FIGS. 4A-4C, shown is a flowchart that provides one example of the operation of a portion of the RDU 100 according to various embodiments. It is understood that the flowchart of FIGS. 4A-4C provide merely an example of the many different types of functional arrangements that may be employed to implement the operation of the portion of the RDU 100 as described herein. As an alternative, the flowchart of FIGS. 4A-4C may be viewed as depicting an example of elements of a method implemented in the RDU 100 according to one or more embodiments.

Beginning with box 403, the RDU 100 approaches a storage unit 103. For example, the RDU 100 may approach a storage unit 103 along a predetermined or predefined path (e.g., along a defined corridor between rows of storage units). The RDU 100 may, for example, approach the storage unit 103 in response to instructions received from the RDU dispatch application 321.

Referring next to box 406, the RDU 100 moves underneath the storage unit 103. While initially positioning itself underneath the storage unit 103, the RDU 100 may use the forward-facing image capture device 106 to capture one or more images. The RDU 100 can then perform image analysis to identify the legs of the storage unit 103 in order to avoid hitting the legs of the storage unit 103 as the RDU 100 moves underneath the storage unit 103. The RDU 100 may also perform image analysis to identify other obstacles, such as items, bins, or boxes on the floor, that would require the RDU 100 to shift its approach as the RDU 100 moved underneath the storage unit 103.

Moving to box 409, the RDU 100 captures an image of the ground fiducial 313 using the downward-facing image capture device 107. In some instances, the RDU 100 may perform image analysis to identify the ground fiducial 313 in the captured image. If the ground fiducial 313 is not identified in the captured image, the RDU 100 may attempt to capture another image of the ground fiducial 313 or may reposition itself slightly underneath the storage unit 103 before capturing another image in case the ground fiducial 313 was originally out of view of the downward-facing image capture device 109.

Proceeding to box 413, the RDU 100 places itself at a predetermined location relative to the ground fiducial 313. For example, the RDU 100 could center itself on top of the ground fiducial 313 after it identifies the ground fiducial 313 in a captured image. In order to accurately position itself, the RDU 100 may repeatedly capture a series of image using the downward-facing image capture device 109 as the RDU 100 moves. This allows the RDU 100 to guide itself by determining if it is moving towards or away from the ground fiducial 313 and whether any corrections are needed.

Referring next to box 416, the RDU 100 rotates itself while capturing a panoramic image (e.g. a single image, a sequence of overlapping images, a sequence of adjacent images, a video, or other visual representation) using the forward-facing image capture device 106. In some instances, the RDU 100 may rotate as much as 360 degrees (i.e., a full circle) while capturing the panoramic image of the area surrounding the RDU 100. However, in other instances, the RDU 100 may rotate through a shorter arc if a full 360 degree rotation is unnecessary.

In some instances, the RDU 100 may use a rear-facing image capture device 107 in conjunction with the forward-facing image capture device 106. In these instances, a larger panoramic image can be captured using a shorter rotation arc. For example, when rear-facing image capture device 107 is used in conjunction with a forward-facing image capture device 106, the RDU 100 could capture a 360 degree panoramic image while only rotating 180 degrees by combining the panoramic image obtained with the rear-facing image capture device 107 with the panoramic image obtained from the forward-facing image capture device 106.

Moving to box 419, the RDU 100 identifies one or more legs of the storage unit 103 under which the RDU 100 is currently positioned. For example, the RDU 100 could use various computer vision techniques to identify one or more legs of the storage unit 103 in the panoramic image previously captured in box 416. The RDU 100 can then store the position of the legs of the storage unit 103 relative to itself and relative to the storage unit 103 for preventing accidents while transporting the storage unit 103, as further described.

In some embodiments, the RDU 100 may also identify one or more storage unit fiducials 316 affixed to the storage unit 103 at box 419. The RDU 100 could then extract information encoded in the one or more storage unit fiducials 316 and send it to the RDU dispatch application 321 to confirm that the RDU 100 is underneath the correct storage unit 103. If the RDU 100 is underneath the correct storage unit 103, then the process would continue to box 423. If the RDU 100 were not underneath the correct storage unit 103, the RDU 100 could move to the correct storage unit 103 (e.g., based on a new location provided by the RDU dispatch application 321) and restart the process.

Proceeding to box 423, the RDU 100 calculates a distance from each of the legs of the storage unit 103 to the ground fiducial 313 over which the RDU 100 is currently centered. This can be accomplished in several ways. Any one or more of these approaches may be used in various embodiments of the present disclosure.

For example, if the forward-facing image capture device 106 is a three-dimensional camera, the distance information may already be embedded in the panoramic image captured in box 416. In these instances, the value for the distance from the forward-facing image capture device 106 to the leg could be extracted from the panoramic image. The value for the distance from the forward-facing image capture device to the leg of the storage unit 103 adjusted to compensate for the dimensions of the RDU 100.

In examples where the forward-facing image capture device 106 comprises a two-dimensional camera, other approaches could be used. For example, a range-finder mounted to the RDU 100 could be used to measure the distance between the leg of the storage unit 103 and the RDU 100. The value for the distance from the forward-facing image capture device 106 to the leg of the storage unit 103 can be adjusted to compensate for the dimensions of the RDU 100.

Referring next to box 426 of FIG. 4B, the RDU 100 calculates the location of the center of the storage unit 103. This may be done by determining the relative positions of the legs of the storage unit 103 and calculating where the center of the storage unit 103 should be located relative to the positions of the legs of the storage unit 103. For example, the RDU 100 could use triangulation, or similar approaches, to identify the location of the center of the storage unit 103 relative to the location of two or more legs of the storage unit 103.

Moving to box 429, the RDU 100 determines whether it is currently centered underneath the storage unit 103 or whether the RDU 100 is located off-center relative to the center of the storage unit 103. This can be determined by comparing the location of the ground fiducial 313 to the center of the storage unit 103 previously calculated at box 426. If the location of the ground fiducial 313 fails to match the location of the center of the storage unit 103, then the RDU 100 can determine that is off-center relative to the position of the storage unit 103 because the RDU 100 is currently centered over the ground fiducial 313. In this instance, the process proceeds to box 433. However, if the location of the ground fiducial 313 matches the location of the center of the storage unit 103, then the process skips to box 436.

Proceeding to box 433, the RDU 100 moves underneath the storage unit 103 to reposition itself relative to the center of the storage unit 103. In some instances, the RDU 100 may, after moving, confirm that it is located at the center of the storage unit 103 by repeating one or more of boxes 416-429. If the RDU 100 remains off-center, the RDU will move again towards the location of the center of the storage unit 103 and repeat the process until the RDU 100 is centered underneath the storage unit 103.

Referring next to box 436, the RDU 100 lifts the storage unit 103. For example, the RDU 100 may use an integrated lift or similar mechanism to raise the storage unit 103 off the ground.

Moving to box 439, the RDU 100 then captures another image with the forward-facing image capture device 106. The captured image can be used later in the process to ensure that the storage unit 103 is safely handled as the RDU 100 moves.

Proceeding to box 443 of FIG. 4C, the RDU 100 moves along a path, carrying the storage unit 103 with it. In some instances, the RDU 100 may have previously received the path from the RDU dispatch application 321 when the RDU 100 was originally dispatched to the storage unit 103. In other instances, the RDU 100 may, at this stage, request a path from the path generation application 323. In these instances, the request from the RDU 100 may include the current location of the RDU 100 and the destination of the RDU 100 previously received from the RDU dispatch application 321.

Referring next to box 446, the RDU 100 captures a second image using the forward-facing image capture device 106.

Moving to box 449, the RDU 100 compares the image captured at box 439 to the image captured at box 446 to determine whether the storage unit 103 has shifted position on the RDU 100 during transit. However, if the RDU 100 has already captured an image in a prior iteration of box 446, the RDU 100 may compare a current image to an image captured in a prior iteration. In either case, the shift of the storage unit 103 can be determined using a number of approaches. These approaches can be used separately or in combination, depending on the particular embodiment of the present disclosure.

In a first approach, the RDU 100 can compare two images obtained with the forward-facing image capture device 106 to identify lateral shifts in the position of the storage unit 103 on top of the RDU 100. For example, the RDU 100 can identify in the first image one or more legs of the storage unit 103 positioned in front of the RDU 100 as the storage unit 103 rests on top of the RDU 100. The RDU 100 can then compare the position of the legs of the storage unit 103 in the first image with the corresponding position of the legs of the storage unit 103 in the second image. If the positions of the legs of the storage unit have shifted left or right, the RDU 100 can determine that the storage unit 103 atop the RDU 100 has correspondingly shifted left or right or back and forth In a second approach, the RDU 100 can compare two images obtained with the forward-facing image capture device 106 to identify vertical shifts in the position of the storage units 103. For example, the RDU 100 can identify in the first image one or more legs of the storage unit 103 and similarly identify in the second image one or more legs of the storage unit 103. In each image, the RDU 100 can identify distinguishing characteristics of the legs of the storage unit 103 (e.g., bottom of the legs, marks on the side of the legs, etc.). If the distinguishing characteristics of the legs of the storage unit 103 in one image are at a different vertical height (e.g., higher or lower) than in the other image, the RDU 100 can determine that a vertical displacement of the storage unit 103 is occurring. Such a vertical displacement could include swaying, tilting, jostling, or other vertical displacements.

At this point, the process can branch along two paths. In the first branch, the RDU 100 determines that the storage unit 103 has not shifted while the RDU 100 has moved and the process proceeds to box 453. In the second branch, the RDU 100 determines that the storage unit 103 has shifted (e.g., vertical displacement, horizontal displacement, or both), and the process proceeds to box 459.

Proceeding to box 453, the RDU 100 determines if an obstacle exists in its path. The RDU 100 can, for example, process the image previously captured at box 446 to identify obstacles using a variety of computer vision techniques. These techniques could include edge detection of potential objects, grey scale or gradient matching of potential objects, and similar approaches. If no obstacle is detected, the process loops back to box 443 and the process of boxes 443-449 are repeated again. However, if an obstacle is detected, the process proceeds to box 456.

Referring next to box 456, the RDU 100 requests or otherwise obtains a new path from the path generation application 323. The request may be sent across the network 306 using a network interface. The request for a new path could include the current location of the RDU 100, the nature of the obstacle blocking the current path, the location of the obstacle blocking the current path, and potentially other information. In response, the RDU 100 receives a new path to follow to its destination from the path generation application 323. The RDU 100 updates its internal routing to follow the new path. The process loops back to box 443 and the process of boxes 443-449 are repeated again as the RDU 100 follows its new path.

However, if at box 449 the process instead proceeded to box 459, the RDU 100 determines whether it is safe for the RDU 100 to continue moving with the storage unit 103. This determination can be based at least in part on a variety of factors. For example, the RDU 100 could determine the likelihood of the storage unit 103 tilting and falling off of the RDU 100 based at least in part on whether the vertical displacement or horizontal displacement exceeds a predefined threshold amount of permissible displacement that correlates with an unacceptable likelihood of the storage unit 103 tilting and falling. Lower thresholds for vertical or horizontal displacement can also be used to account for movement of the storage unit 103 that, while unlikely to cause the storage unit 103 to fall, is likely to shift the arrangement of items within the storage unit 103, which may result in damage to items in the storage unit 103 or cause the items 103 to shift position in the storage unit (e.g., fall out of the storage unit 103, move location on a shelf of the storage unit 103, etc.). Similarly, the RDU 100 could, based on a series of images, determine an amount or degree of sway induced in the storage unit 103 as the RDU 100 moves. If the amount or degree of sway exceeds a predefined threshold level, the RDU 100 could determine that the sway of the storage unit 103 is likely to cause an impermissible shift in the position of items stored in the storage unit 103.

The process can branch again at this point. If the RDU 100 determines that it is still safe to move with the storage unit 103, then the process loops back to box 443 and repeats itself. However, if the RDU 100 determines that it is no longer safe to move, then the process proceeds to box 463.

Proceeding to box 463, the RDU 100 halts movement in order to prevent further damage to the items in the storage unit 103 or to prevent the storage unit 103 from swaying or tilting even more. To halt movement, the RDU 100 may slow down in a gradual manner in order to avoid a sudden stop causing the storage unit 103 from shifting, tilting, or falling over due to inertia.

Referring next to box 466, the RDU 100 sends an alert to the RDU dispatch application 321. The alert can include information such as the current location of the RDU 100, the reason the RDU 100 stopped, the status of the storage unit 103 (e.g., still located on top of the RDU 100, fell off of the RDU 100, or other status) and potentially other information. This information will allow the RDU dispatch application 321 to send assistance (e.g., a technician) to the RDU 100. The process subsequently ends.

Figure 5A:
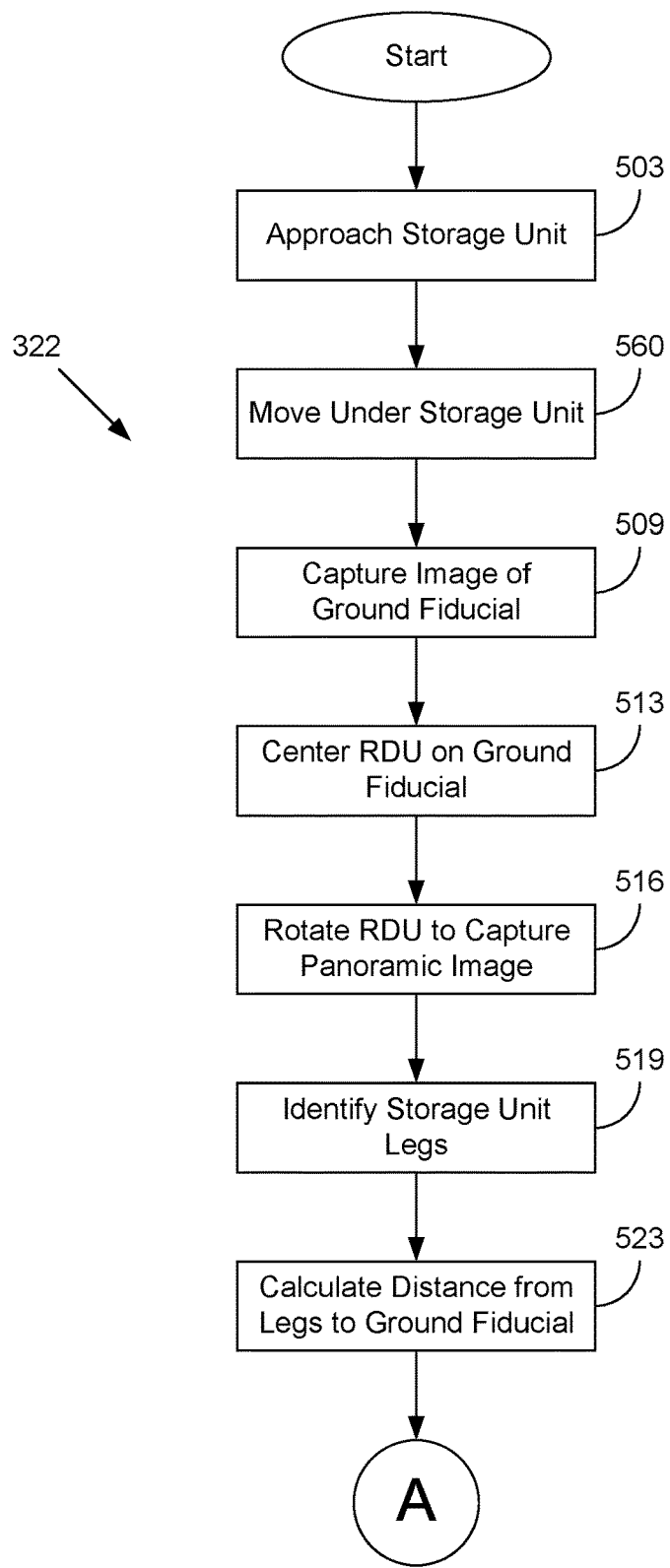
FIGS. 5A-5C depict a flowchart illustrating one example of functionality implemented as portions of an application executed in the networked environment of FIG. 3 according to various embodiments of the present disclosure.
Figure 5B:
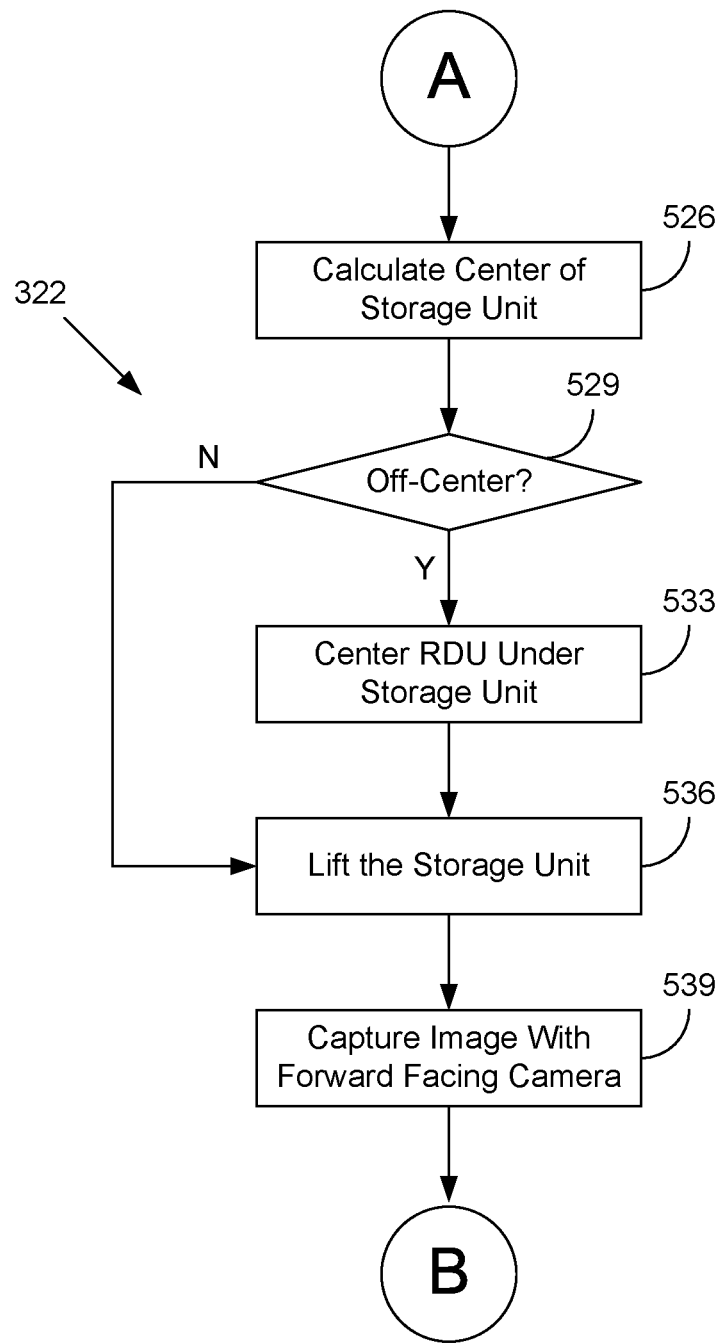
Figure 5C:
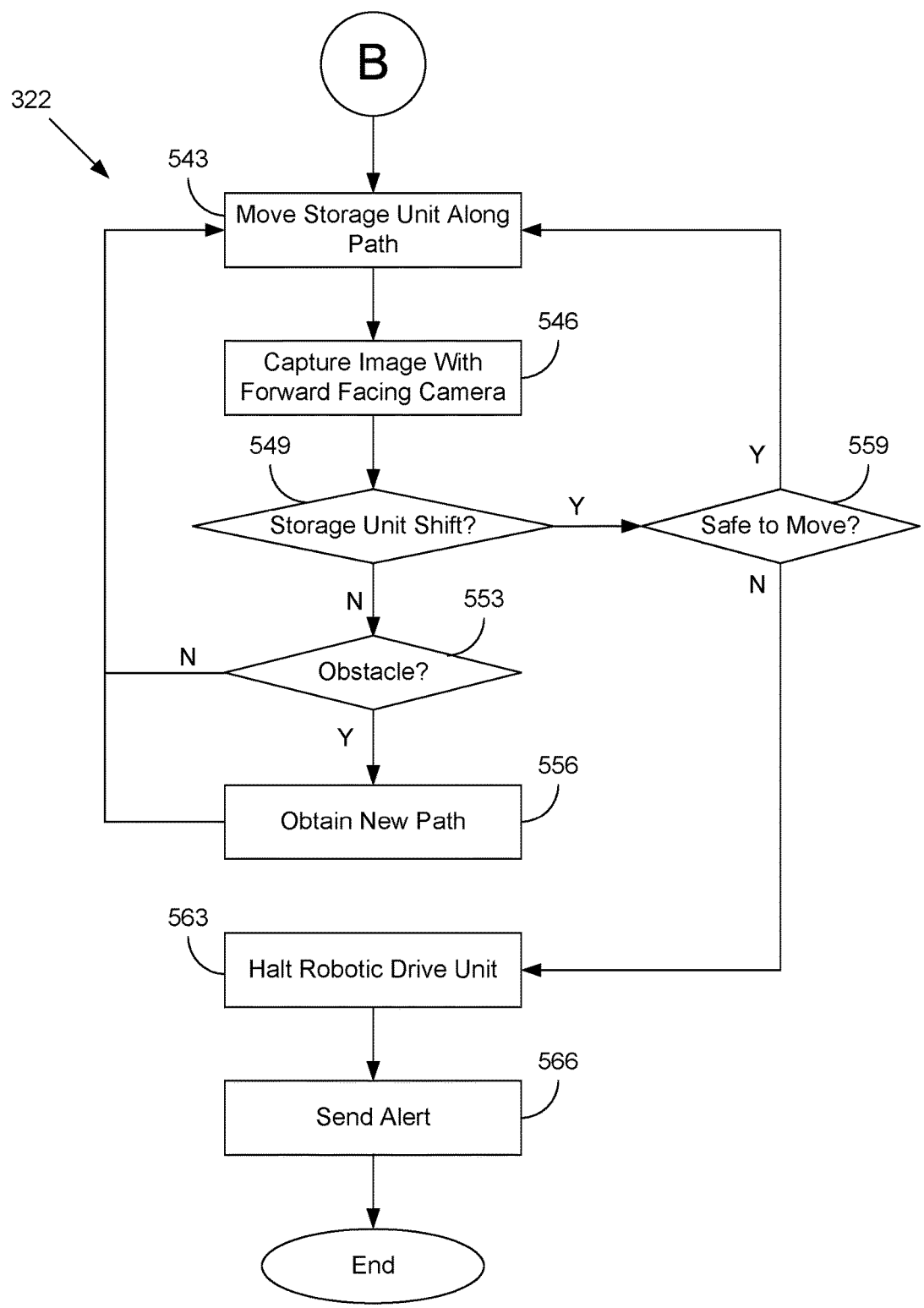

Referring next to FIGS. 5A-5C, shown is a flowchart that provides one example of the operation of a portion of the drive agent 322 according to various embodiments. It is understood that the flowchart of FIGS. 5A-5C provide merely an example of the many different types of functional arrangements that may be employed to implement the operation of the portion of the drive agent 322 as described herein. As an alternative, the flowchart of FIGS. 5A-5C may be viewed as depicting an example of elements of a method implemented in the drive agent 322 according to one or more embodiments.

Beginning with box 503, the drive agent 322 instructs the RDU 100 to approach a storage unit 103. For example, the drive agent 322 may instruct the RDU 100 to approach a storage unit 103 along a predetermined or predefined path (e.g., along a defined corridor between rows of storage units).

Referring next to box 506, the drive agent 322 sends one or more commands or instructions to the RDU 100 to move underneath the storage unit 103. In some instances, the drive agent 322 may send one or more commands or instructions to the RDU 100 to use the forward-facing image capture device 106 to capture one or more images as the RDU 100 positions itself underneath the storage unit 103. The RDU 100 may then send the images to the drive agent 322 to perform image analysis to identify the legs of the storage unit 103 in order to send further movement instructions to the RDU 100 to have the RDU 100 avoid hitting the legs of the storage unit 103 as the RDU 100 moves underneath the storage unit 103. The drive agent 322 may also perform image analysis to identify other obstacles, such as items, bins, or boxes on the floor, that would require the RDU 100 to shift its approach as the RDU 100 moved underneath the storage unit 103.

Moving to box 509, the drive agent 322 can send one or more commands or instructions to the RDU 100 to capture an image of the ground fiducial 313 using the downward-facing image capture device 107 send the captured image to the drive agent 322. In some instances, drive agent 322 may perform image analysis to identify the ground fiducial 313 in the captured image. If the ground fiducial 313 is not identified in the captured image, the drive agent 322 may instruct the RDU 100 to attempt to capture another image of the ground fiducial 313 or to reposition itself slightly underneath the storage unit 103 before capturing another image in case the ground fiducial 313 was originally out of view of the downward-facing image capture device 109.

Proceeding to box 513, the drive agent 322 can instruct or command the RDU 100 to place itself at a predetermined location relative to the ground fiducial 313. For example, the drive agent 322 could instruct the RDU 100 to center itself on top of the ground fiducial 313 after the drive agent 322 identifies the ground fiducial 313 in a captured image. In order to accurately position the RDU 100, the drive agent 322 can instruct the RDU 100 to repeatedly capture a series of images using the downward-facing image capture device 109 as the RDU 100 moves and send these images to the drive agent 322. This allows the drive agent 322 to guide the RDU 100 by determining if it is moving towards or away from the ground fiducial 313 and whether any corrections are needed.

Referring next to box 516, the drive agent 322 can command the RDU 100 to rotate itself while capturing a panoramic image (e.g. a single image, a sequence of overlapping images, a sequence of adjacent images, a video, or other visual representation) using the forward-facing image capture device 106. In some instances, the drive agent 322 can command the RDU 100 to rotate as much as 360 degrees (i.e., a full circle) while capturing the panoramic image of the area surrounding the RDU 100. However, in other instances, the drive agent 322 can command the RDU 100 to rotate through a shorter arc if a full 360 degree rotation is unnecessary.

In some instances, the drive agent 322 can further command the RDU 100 to use a rear-facing image capture device 107 in conjunction with the forward-facing image capture device 106. In these instances, a larger panoramic image can be captured using a shorter rotation arc. For example, when rear-facing image capture device 107 is used in conjunction with a forward-facing image capture device 106, the RDU 100 could capture a 360 degree panoramic image while only rotating 180 degrees by combining the panoramic image obtained with the rear-facing image capture device 107 with the panoramic image obtained from the forward-facing image capture device 106.

Moving to box 519, the drive agent 322 can identifies one or more legs of the storage unit 103 under which the RDU 100 is currently positioned based at least in part on images received from the RDU 100. For example, the drive agent 322 could use various computer vision techniques to identify one or more legs of the storage unit 103 in the panoramic image previously captured in box 516. The drive agent 322 can then store the position of the legs of the storage unit 103 relative to the position of the RDU 100 and relative to the storage unit 103 for preventing accidents while transporting the storage unit 103, as further described.

In some embodiments, the drive agent 322 may also identify one or more storage unit fiducials 316 affixed to the storage unit 103 at box 519. The drive agent 322 could then extract information encoded in the one or more storage unit fiducials 316 and send it to the RDU dispatch application 321 to confirm that the RDU 100 is underneath the correct storage unit 103. If the RDU 100 is underneath the correct storage unit 103, then the process would continue to box 523. If the RDU 100 were not underneath the correct storage unit 103, the drive agent 322 could send a command or instruction to the RDU 100 to move to the correct storage unit 103 (e.g., based on a new location provided by the RDU dispatch application 321) and restart the process.

Proceeding to box 523, the drive agent 322 calculates a distance from each of the legs of the storage unit 103 to the ground fiducial 313 over which the RDU 100 is currently centered. This can be accomplished in several ways. Any one or more of these approaches may be used in various embodiments of the present disclosure.

For example, if the forward-facing image capture device 106 is a three-dimensional camera, the distance information may already be embedded in the panoramic image captured in box 516. In these instances, the value for the distance from the forward-facing image capture device 106 to the leg could be extracted from the panoramic image. The value for the distance from the forward-facing image capture device to the leg of the storage unit 103 adjusted to compensate for the dimensions of the RDU 100.

In examples where the forward-facing image capture device 106 comprises a two-dimensional camera, other approaches could be used. For example, a range-finder mounted to the RDU 100 could be used to measure the distance between the leg of the storage unit 103 and the RDU 100. The value for the distance from the forward-facing image capture device 106 to the leg of the storage unit 103 can be adjusted to compensate for the dimensions of the RDU 100.

Referring next to box 526 of FIG. 4B, the drive agent 322 calculates the location of the center of the storage unit 103. This may be done by determining the relative positions of the legs of the storage unit 103 and calculating where the center of the storage unit 103 should be located relative to the positions of the legs of the storage unit 103. For example, the drive agent 322 could use triangulation, or similar approaches, to identify the location of the center of the storage unit 103 relative to the location of two or more legs of the storage unit 103.

Moving to box 529, the drive agent 322 determines whether the RDU 100 is currently centered underneath the storage unit 103 or whether the RDU 100 is located off-center relative to the center of the storage unit 103. This can be determined by comparing the location of the ground fiducial 313 to the center of the storage unit 103 previously calculated at box 526. If the location of the ground fiducial 313 fails to match the location of the center of the storage unit 103, then the drive agent 322 can determine that the RDU 100 is off-center relative to the position of the storage unit 103 because the RDU 100 is currently centered over the ground fiducial 313. In this instance, the process proceeds to box 533. However, if the location of the ground fiducial 313 matches the location of the center of the storage unit 103, then the process skips to box 536.

Proceeding to box 533, the drive agent 322 instructs or commands the RDU 100 to move underneath the storage unit 103 to reposition itself relative to the center of the storage unit 103. In some instances, the drive agent 322 may, after moving, confirm that the RDU 100 is located at the center of the storage unit 103 by repeating one or more of boxes 516-529. If the RDU 100 remains off-center, the drive agent 322 can instruct the RDU 100 to move again towards the location of the center of the storage unit 103. The drive agent 322 can repeat the process until the RDU 100 is centered underneath the storage unit 103.

Referring next to box 536, the drive agent 322 instructs the RDU 100 to lifts the storage unit 103. In response, the RDU 100 may use an integrated lift or similar mechanism to raise the storage unit 103 off the ground.

Moving to box 539, the drive agent 322 then instructs or commands the RDU 100 to capture another image with the forward-facing image capture device 106. The RDU 100 then captures the image and provides it to the drive agent 322 in response. The captured image can be used later in the process to ensure that the storage unit 103 is safely handled as the RDU 100 moves.

Proceeding to box 543 of FIG. 4C, the drive agent 322 instructs the RDU 100 to move along a path, carrying the storage unit 103 with it. In some instances, the drive agent 322 will supply the path to the RDU 100. The may have been previously received the path from the RDU dispatch application 321 when the RDU 100 was originally dispatched to the storage unit 103. In other instances, drive agent 322 may, at this stage, request a path from the path generation application 323 and supply the path to the RDU 100. In these instances, the request from the RDU 100 may include the current location of the RDU 100 and the destination of the RDU 100 previously received from the RDU dispatch application 321.

Referring next to box 546, the drive agent 322 instructs the RDU 100 to capture a second image using the forward-facing image capture device 106. In response, the RDU 100 captures the second image and provides it to the drive agent 322.

Moving to box 549, the drive agent 322 compares the image captured at box 539 to the image captured at box 546 to determine whether the storage unit 103 has shifted position on the RDU 100 during transit. However, if the RDU 100 has already captured an image in a prior iteration of box 546, the drive agent 322 may compare a current image to an image captured in a prior iteration. In either case, the shift of the storage unit 103 can be determined using a number of approaches. These approaches can be used separately or in combination, depending on the particular embodiment of the present disclosure.

In a first approach, the drive agent 322 can compare two images obtained with the forward-facing image capture device 106 to identify lateral shifts in the position of the storage unit 103 on top of the RDU 100. For example, the drive agent 322 can identify in the first image one or more legs of the storage unit 103 positioned in front of the RDU 100 as the storage unit 103 rests on top of the RDU 100. The drive agent 322 can then compare the position of the legs of the storage unit 103 in the first image with the corresponding position of the legs of the storage unit 103 in the second image. If the positions of the legs of the storage unit have shifted left or right, the drive agent 322 can determine that the storage unit 103 atop the RDU 100 has correspondingly shifted left or right or back and forth In a second approach, the drive agent 322 can compare two images obtained with the forward-facing image capture device 106 to identify vertical shifts in the position of the storage units 103. For example, the drive agent 322 can identify in the first image one or more legs of the storage unit 103 and similarly identify in the second image one or more legs of the storage unit 103. In each image, the drive agent 322 can identify distinguishing characteristics of the legs of the storage unit 103 (e.g., bottom of the legs, marks on the side of the legs, etc.). If the distinguishing characteristics of the legs of the storage unit 103 in one image are at a different vertical height (e.g., higher or lower) than in the other image, the drive agent 322 can determine that a vertical displacement of the storage unit 103 is occurring. Such a vertical displacement could include swaying, tilting, jostling, or other vertical displacements.

At this point, the process can branch along two paths. In the first branch, the drive agent 322 determines that the storage unit 103 has not shifted while the RDU 100 has moved and the process proceeds to box 553. In the second branch, the drive agent 322 determines that the storage unit 103 has shifted (e.g., vertical displacement, horizontal displacement, or both), and the process proceeds to box 559.

Proceeding to box 553, the drive agent 322 determines if an obstacle exists in the path of the RDU 100. The drive agent 322 can, for example, process the image previously captured at box 546 to identify obstacles using a variety of computer vision techniques. These techniques could include edge detection of potential objects, grey scale or gradient matching of potential objects, and similar approaches. If no obstacle is detected, the process loops back to box 543 and the process of boxes 543-549 are repeated again. However, if an obstacle is detected, the process proceeds to box 556.

Referring next to box 456, the drive agent 322 requests or otherwise obtains a new path from the path generation application 323. The request for a new path could include the current location of the RDU 100, the nature of the obstacle blocking the current path, the location of the obstacle blocking the current path, and potentially other information. In response, the drive agent 322 receives a new path for the RDU 100 to follow to its destination from the path generation application 323. The drive agent 322 then begins issuing commands to the RDU 100 to follow the new path. The process loops back to box 543 and the process of boxes 543-549 are repeated again as the RDU 100 follows the new path.

However, if at box 549 the process instead proceeded to box 559, the drive agent 322 determines whether it is safe for the RDU 100 to continue moving with the storage unit 103. This determination can be based at least in part on a variety of factors. For example, the drive agent 322 could determine the likelihood of the storage unit 103 tilting and falling off of the RDU 100 based at least in part on whether the vertical displacement or horizontal displacement exceeds a predefined threshold amount of permissible displacement that correlates with an unacceptable likelihood of the storage unit 103 tilting and falling. Lower thresholds for vertical or horizontal displacement can also be used to account for movement of the storage unit 103 that, while unlikely to cause the storage unit 103 to fall, is likely to shift the arrangement of items within the storage unit 103, which may result in damage to items in the storage unit 103 or cause the items 103 to shift position in the storage unit (e.g., fall out of the storage unit 103, move location on a shelf of the storage unit 103, etc.). Similarly, the drive agent 322 could, based on a series of images, determine an amount or degree of sway induced in the storage unit 103 as the RDU 100 moves. If the amount or degree of sway exceeds a predefined threshold level, the drive agent 322 could determine that the sway of the storage unit 103 is likely to cause an impermissible shift in the position of items stored in the storage unit 103.

The process can branch again at this point. If the drive agent 322 determines that it is still safe for the RDU 100 to move with the storage unit 103, then the process loops back to box 543 and repeats itself. However, if the drive agent 322 determines that it is no longer safe for the RDU 100 to move, then the process proceeds to box 563.

Proceeding to box 563, the drive agent 322 instructs the RDU 100 to halt movement in order to prevent further damage to the items in the storage unit 103 or to prevent the storage unit 103 from swaying or tilting even more. To halt movement, the drive agent 322 may command the RDU 100 to slow down in a gradual manner in order to avoid a sudden stop causing the storage unit 103 from shifting, tilting, or falling over due to inertia.

Referring next to box 566, the drive agent 322 sends an alert to the RDU dispatch application 321. The alert can include information such as the current location of the RDU 100, the reason the RDU 100 stopped, the status of the storage unit 103 (e.g., still located on top of the RDU 100, fell off of the RDU 100, or other status) and potentially other information. This information will allow the RDU dispatch application 321 to send assistance (e.g., a technician) to the RDU 100. The process subsequently ends.

Figure 6:
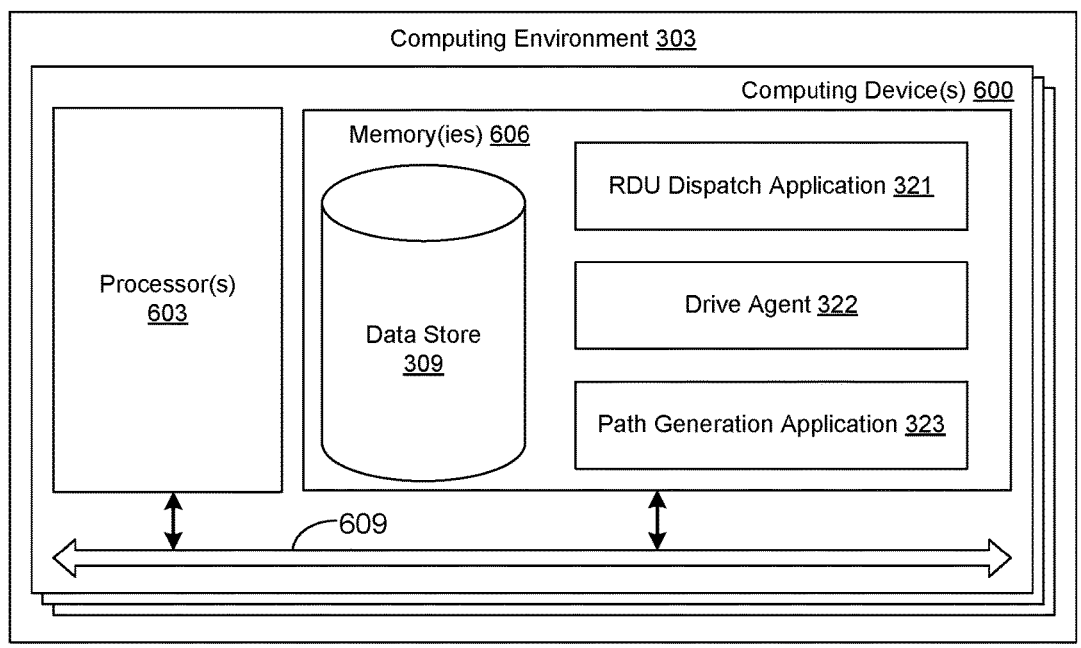
FIG. 6 is a schematic block diagram that provides one example illustration of a computing environment employed in the networked environment of FIG. 3 according to various embodiments of the present disclosure.

With reference to FIG. 6, shown is a schematic block diagram of the computing environment 303 according to an embodiment of the present disclosure. The computing environment 303 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are RDU dispatch application 321, the path generation application 323, and potentially other applications. Also stored in the memory 606 may be a data store 309 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although RDU dispatch application 321, the drive agent 322, the path generation application 323, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIGS. 4A-4C shows the functionality and operation of an implementation of portions of the RDU 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor included in the RDU 100. The machine code may be converted from the source code, etc. If embodied in hardware, each block may represent a circuit or a number of interconnected circuits to implement the specified logical function(s).

Although the flowchart of FIGS. 4A-4C shows a specific order of execution, it is understood that the order of execution may differ from that which is depicted. For example, the order of execution of two or more blocks may be scrambled relative to the order shown. Also, two or more blocks shown in succession in FIGS. 4A-4C may be executed concurrently or with partial concurrence. Further, in some embodiments, one or more of the blocks shown in FIGS. 4A-4C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The flowchart of FIGS. 5A-5C shows the functionality and operation of an implementation of portions of the drive agent 322. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIGS. 5A-5C shows a specific order of execution, it is understood that the order of execution may differ from that which is depicted. For example, the order of execution of two or more blocks may be scrambled relative to the order shown. Also, two or more blocks shown in succession in FIGS. 5A-5C may be executed concurrently or with partial concurrence. Further, in some embodiments, one or more of the blocks shown in FIGS. 5A-5C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the RDU dispatch application 321, the drive agent 322, and the path generation application 323, that includes software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the RDU dispatch application 321, the drive agent 322, and the path generation application 323, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 303.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a downward facing camera;
   a forward facing camera;
   a processor; and
   a memory storing machine-readable instructions that, when executed by the processor, cause the system to at least:
   move underneath a storage unit;
   capture an image of a fiducial located on the ground using the downward facing camera;
   center the system on the fiducial;
   rotate the system in place around the fiducial;
   capture a panoramic image with the forward facing camera as the system rotates;
   identify a plurality of legs of the storage unit in the panoramic image;
   triangulate a location of the center of the storage unit relative to the fiducial based at least in part on the plurality of legs in the panoramic image;
   determine that the system is centered relative to the storage unit;
   lift the storage unit;
   capture a first image of at least two the plurality of the legs of the storage unit using the forward facing camera in response to causing the system to lift the storage unit;
   move the storage unit to a new location;
   capture a second image of the at least two of the plurality of legs of the storage unit using the forward facing camera while the system is in motion;
   measure a change in position of the at least two of the plurality of legs of the storage unit in the second image compared to the first image; and
   determine that the storage unit has changed position or orientation on top of the system based at least in part on the change in position.

2. The system of claim 1, wherein the forward facing camera comprises a three-dimensional camera configured to capture a point cloud and the panoramic image comprises a point cloud.

3. The system of claim 1, wherein the downward facing camera is located on the bottom surface of the system.

4. A robotic drive unit, comprising:
   a forward facing camera;

a downward facing camera;
a processor;
a memory; and
an application comprising machine readable instructions stored in the memory that, when executed by the processor, cause the robotic drive unit to:
move under a storage unit;
capture an image of a fiducial located on the ground using the downward facing camera;
position the robotic drive unit relative to the fiducial;
rotate the robotic drive unit in place;
capture a panoramic image with the forward facing camera;
identify a plurality of legs of the storage unit in the panoramic image;
measure a distance from each of the plurality of legs of the storage unit to the fiducial;
calculate a location under the storage unit relative to the fiducial;
determine that the robotic drive unit is out of position relative to the calculated location under the storage unit;
travel to the calculated location under the storage unit; and
lift the storage unit.

5. The robotic drive unit of claim 4, further comprising a network interface and wherein:
the fiducial comprises a first fiducial; and
the application further comprises machine readable instructions stored in the memory that, when executed by the processor, cause the robotic drive unit to:
identify in the panoramic image a second fiducial on one of the plurality of legs of the storage unit;
extract an identifier of the storage unit from the second fiducial; and
send a request via the network interface to a remote computing device, wherein the request comprises the identifier of the storage unit.

6. The robotic drive unit of claim 4, wherein the application further comprises machine readable instructions stored in the memory that, when executed by the processor, cause the robotic drive unit to:
capture a first image of at least two of the plurality of the legs of the storage unit using the forward facing camera in response to causing the robotic drive unit to lift the storage unit;
move the storage unit to a new location;
capture a second image of the at least two of the plurality of legs of the storage unit using the forward facing camera while the robotic drive unit is in motion;
measure a change in position of the at least two of the plurality of legs of the storage unit in the second image compared to the first image; and
determine that the storage unit has changed position or orientation on top of the robotic drive unit based at least in part on the change in position.

7. The robotic drive unit of claim 4, further comprising a network interface and wherein the application further comprises machine readable instructions stored in the memory that, when executed by the processor, cause the robotic drive unit to:
capture a first image using the forward facing camera in response to causing the robotic drive unit to lift the storage unit;
determine that at least two of the plurality of the legs of the storage unit are in the first image;
move the storage unit to a new location;
capture a second image using the forward facing camera while the robotic drive unit is in motion;
determine that the at least two of the plurality of legs of the storage unit are missing from the second image; and
send an alert via the network interface to a remote computing system, wherein the alert indicates that the storage unit has fallen from the robotic drive unit.

8. The robotic drive unit of claim 4, wherein the application further comprises machine readable instructions stored in the memory that, when executed by the processor, cause the robotic drive unit to:
capture a first image of at least two of the plurality of the legs of the storage unit using the forward facing camera while the robotic drive unit is in motion;
capture a second image of the at least two of the plurality of legs of the storage unit using the forward facing camera while the robotic drive unit is in motion; and
measure a vertical change in position of the at least two of the plurality of legs of the storage unit in the second image compared to the first image.

9. The robotic drive unit of claim 8, wherein the application further comprises machine readable instructions stored in the memory that, when executed by the processor, cause the robotic drive unit to calculate a likelihood that the storage unit will tip over based at least in part on the vertical change in position of the at least two of the plurality of legs of the storage unit.

10. The robotic drive unit of claim 8, wherein the application further comprises machine readable instructions stored in the memory that, when executed by the processor, cause the robotic drive unit to calculate an amount of sway of the storage unit while the robotic drive unit is in motion.

11. The robotic drive unit of claim 8, wherein the application further comprises machine readable instructions stored in the memory that, when executed by the processor, cause the robotic drive unit to calculate an amount of vertical displacement of the storage unit while robotic drive unit is in motion.

12. The robotic drive unit of claim 4, wherein the downward facing camera is located on the bottom surface of the robotic drive unit.

13. The robotic drive unit of claim 4, wherein the forward facing camera comprises a three-dimensional camera configured to capture a point cloud.

14. The robotic drive unit of claim 13, wherein the panoramic image comprises the point cloud.

15. The robotic drive unit of claim 4, wherein the application further comprises machine readable instructions stored in the memory that, when executed by the processor, cause the robotic drive unit to:
move the storage unit;
capture an image using the forward facing camera; and
identify an obstacle in the image that blocks a current path of the robotic drive unit.

16. The robotic drive unit of claim 15, wherein the application further comprises machine readable instructions stored in the memory that, when executed by the processor, cause the robotic drive unit to request a new path for the robotic drive unit from a remote computing device in response to identification of the obstacle in the image.

17. A system, comprising:
a computing device comprising a processor and a memory;
a robotic drive unit (RDU) in data communication with the computing device via a network and comprising a forward facing camera and a downward facing camera; and an application comprising machine readable instructions stored in the memory that, when executed by the processor, cause computing device to at least:
  command the RDU to move under a storage unit;
  command the RDU to capture an image of a fiducial located on the ground using the downward facing camera;
  command the RDU to position itself relative to the fiducial;
  command the RDU to rotate in place;
  command the RDU to capture a panoramic image with the forward facing camera;
  receive the panoramic image from the RDU
  identify a plurality of legs of the storage unit in the panoramic image;
  measure a distance from each of the plurality of legs of the storage unit to the fiducial;
  calculate a location under the storage unit relative to the fiducial;
  determine that the RDU is out of position relative to the calculated location under the storage unit;
  command the RDU to travel to the calculated location under the storage unit; and
  command the RDU to lift the storage unit.

18. The system of claim 17, wherein the fiducial comprises a first fiducial and the application comprises a first application that further comprises machine readable instructions stored in the memory that, when executed by the processor, cause the computing device to at least:
  identify in the panoramic image a second fiducial on one of the plurality of legs of the storage unit;
  extract an identifier of the storage unit from the second fiducial; and
  send a request to a second application, wherein the request comprises the identifier of the storage unit.

19. The system of claim 17, wherein the application further comprises machine readable instructions stored in the memory that, when executed by the processor, cause the computing device to at least:
  command the RDU to capture a first image of at least two of the plurality of the legs of the storage unit using the forward facing camera in response to the RDU lifting the storage unit;
  command the RDU to move the storage unit to a new location;
  command the RDU to capture a second image of the at least two of the plurality of legs of the storage unit using the forward facing camera while the RDU is in motion;
  receive the first image and the second image from the RDU;
  measure a change in position of the at least two of the plurality of legs of the storage unit in the second image compared to the first image; and
  determine that the storage unit has changed position or orientation on top of the RDU based at least in part on the change in position.

20. The system of claim 17, wherein the application further comprises machine readable instructions stored in the memory that, when executed by the processor, cause the computing device to at least:
  command the RDU to capture a first image of at least two of the plurality of the legs of the storage unit using the forward facing camera while the RDU is in motion;
  command the RDU to capture a second image of the at least two of the plurality of legs of the storage unit using the forward facing camera while the RDU is in motion; and
  measure a vertical change in position of the at least two of the plurality of legs of the storage unit in the second image compared to the first image.

* * * * *